United States Patent [19]

Gilbertson

[11] Patent Number: 4,785,516
[45] Date of Patent: Nov. 22, 1988

[54] METHOD OF INSERTING TUBES INTO HEAT EXCHANGERS AND APPARATUS THEREFOR

[76] Inventor: Richard G. Gilbertson, 2464 E. Medicine Lake Blvd., Plymouth, Minn. 55441

[21] Appl. No.: 824,443

[22] Filed: Jan. 30, 1986

[51] Int. Cl.⁴ .............................................. B21D 53/02
[52] U.S. Cl. ........................... 29/157.3 C; 29/157.3 R; 29/726
[58] Field of Search ............ 29/157.3 R, 157.3 C, 29/428, 33 G, 33 K, 33 T, 726; 414/746; 165/150, 151, 178; 15/104.05

[56] References Cited

U.S. PATENT DOCUMENTS

| | | | |
|---|---|---|---|
| 2,353,125 | 7/1944 | Carpmail | 29/DIG. 98 |
| 4,104,790 | 8/1978 | Hindrichs | 29/726 |
| 4,202,377 | 5/1980 | Harrison | 15/104.05 |
| 4,221,534 | 9/1980 | Rethy | 29/726 |
| 4,380,868 | 4/1983 | Hall | 29/33 G |
| 4,459,917 | 7/1984 | Michael et al. | 29/157.3 C |
| 4,547,963 | 10/1985 | Ohmstede | 414/746 |

FOREIGN PATENT DOCUMENTS

| | | | |
|---|---|---|---|
| 0030963 | 3/1977 | Japan | 29/33 G |
| 0121255 | 10/1978 | Japan | 29/157.3 C |

Primary Examiner—Howard N. Goldberg
Assistant Examiner—Irene Cuda
Attorney, Agent, or Firm—Kinney & Lange

[57] ABSTRACT

An apparatus for inserting tubes (20) into openings in tube sheets or baffles (13) in a heat exchanger such as a steam condenser (12), includes at least one, preferably two, drive members (97,103) such as air inflated tires mounted on wheels, in cooperating relationship on opposite sides of the tube for advancing the tube (20). The tires (97,103) are canted in opposite directions at acute angles for simultaneously rotating the tube (20) on its own axis, whereby the tube (20) rotates as it advances through the baffles (14). The rotation distributes stresses on the tube (20) to help prevent damage to the tube and assist in clearing the tube openings (18) within the condenser (12). The tube (20) is firmly frictionally engaged by the tires (97,103) and a predetermined amount of friction is selected and maintained to allow the tires to slip on the tube when an obstruction is encountered to help reduce damage to the tube and to facilitate passage of the tube into the condenser. A hole cleaner or pilot (130) is mounted on the leading end of the tube (20) with a wire brush (148) which rotates within the openings (18) as the tube advances, thereby cleaning them ahead of the tube. Suitable stops (150) are provided to control the fixed position of the tube (20) in the condenser (12).

24 Claims, 2 Drawing Sheets

METHOD OF INSERTING TUBES INTO HEAT EXCHANGERS AND APPARATUS THEREFOR

FIELD OF THE INVENTION

The present invention relates to heat exchangers and to a method and apparatus for inserting tubes into heat exchangers.

BACKGROUND OF THE INVENTION

Even though equipment has been previously proposed for inserting tubes into heat exchangers, the operation is still performed almost entirely by hand. An important reason for this is the fragility of the tubing which, because it may have a relatively thin wall, can be easily bent or distorted. This is particularly troublesome when holes in the tube sheet or baffles of the heat exchanger are not in perfect alignment or have imperfections or foreign material on their edges which is often the case. Thus, the laborious hand insertion method that has been used for decades is still employed. Typically, one man is spaced about every ten feet along the length of a tube which may be over 40' long. Workmen at various intervals remove tubes from a shipping box, place them near the tube sheet of the heat exchanger and attach pilots. Working in unison, the men pick up the tube, hold it level with the tube sheet hole and walk the tube into the condenser. Any deviation from a straight line may cause the tube to choke or bind since the holes allow only a small amount of clearance (about 0.006 inches) for the tube. Automated equipment has been proposed For example, U.S. Pat. No. 4,104,790 describes a pipe installing apparatus wherein four pipes are simultaneously engaged by two cooperating rollers placed above and below the pipes. No provision is made for helping to prevent the tubes from buckling, bending or becoming distorted during the insertion process as may happen, for example, when the tube encounters an obstruction such as a piece of foreign material on the edge of one or more of the openings through which the tube is passed and no provision is made to cause the tube to extend the proper distance, e.g., ¼", for flaring the end and/or sealing it to the tube sheet. Similarly, U.S. Pat. No. 4,221,534 describes a device for feeding tubes into a heat exchanger which includes a pair of friction wheels for forcing the tubes through openings in the condenser. Again, there is no provision for relieving stresses in the tube as it passes through the maze of perforated baffles. Accordingly, in some situations, there is a tendency for pressures to build up and for the tube to become distorted, bent or otherwise damaged in the insertion process. Moreover, no provision is made for clearing the baffle openings prior to the insertion of the tube nor for allowing the rear end of the tube to project a fraction of an inch from the condenser following insertion.

In view of these and other deficiencies of the prior art, it is an objective of the present invention to provide an improved tube insertion method and apparatus capable of efficiently and dependably inserting a tube measuring 1"×46' at the rate of about two per minute with the proper extension (end stock) following insertion with an effective provision for reducing distortion, bending or related damage to the tubing as it is inserted. A further object is to provide an improved tube insertion method and apparatus wherein a tube can be inserted by a single operator wherein highly skilled labor is not required. A further objective is to provide means for aligning the insertion apparatus with the tube when the leading end of the tube has been placed manually in the heat exchanger. Further objectives include the provision of a simple apparatus that can be manufactured at low cost, is rugged in construction, reliable in operation and unlikely to require maintenance and repair, but which can easily be maintained during use, can be adapted to accept pneumatic, hydraulic or electric power, wherein the speed of insertion can be varied and driving force on the tube can be changed to provide a light or heavy thrust.

SUMMARY OF THE INVENTION

In accordance with one preferred form of the present invention, an improved method is provided for inserting tubes into a heat exchanger such as a cooling condenser by engaging the tubing with at least one endless drive member, advancing and preferably spinning each tube on its own axis as it passes into the condenser whereby the tube is rotated and simultaneously advanced through the condenser to thereby distribute stresses on the tube and relieve the buildup of pressure to help prevent damage to the tube and to assist in clearing the openings of the tube plates and baffles as the tube enters the heat exchanger. Preferably the drive member, if one is used, or both drive members in the event more than one is used, is canted at an oblique angle with respect to the tube to apply a thrust to the tube along a line of force at an acute angle with respect to the axis of the tube so that the tube rotates on its own axis as the tube is advanced. The tube is firmly, frictionally engaged with at least one endless drive member and a predetermined amount of frictional engagement is selected and maintained between the tube and a drive motor to allow the tube to slip when an obstruction is encountered to avoid damage thereto. In one preferred form of the invention, an air inflated endless drive member is provided such as an air inflated tire and the air pressure is selected and maintained to provide a predetermined pressure against the surface of the tube. In this way, the tube is advanced by the endless drive member and is allowed to slip with respect to the tube when the tube engages an obstruction.

Further in accordance with the preferred form of the present invention, a hole cleaner is temporarily mounted on the leading end of the tube, the tube is inserted with the hole cleaner in place on the tube and following insertion, the tube cleaner is removed from the end of the tube. The cleaner can be slideably and hermetically sealed in the leading end of the tube. If this method is used, air under pressure is forced into the tube from the trailing end to remove the cleaner by creating pressure behind it to blow it out the end.

Further in accordance with one preferred form of the invention, a stock setting member is releasably mounted in the trailing end of the tube with a stop member at its forward end. The stop member is allowed to strike a fixed object at the end of the insertion process to thereby establish a predetermined end stock projection on the order of a fraction of an inch.

In accordance with the present invention, an apparatus is provided having at least one and preferably at least two tube engaging members in cooperative positions adapted to engage the tube frictionally and to force it into the heat exchanger. These members can be provided with endless frictional surfaces and, in one preferred form of the invention, comprise a pair of aligned and cooperating air inflated tires adapted to engage the tube on opposite sides. At least one of the tires is motor driven and provision is made for canting the tires at an oblique angle to cause the tube to spin on its own axis as it is advanced.

The invention will now be described in more detail by way of example in the figures.

DESCRIPTION OF THE PREFERRED EMBODIMENT apparatus indicated generally by the numeral 10 is mounted adjacent to a heat exchanger such as a steam condenser 12 having a perforated tube sheet or baffle 13 secured in place at its edges by fastener 16 and including a multiplicity of openings 18 into which tubes such as the tube 20 are to be inserted.

Figures 1, 2, 7, 8:
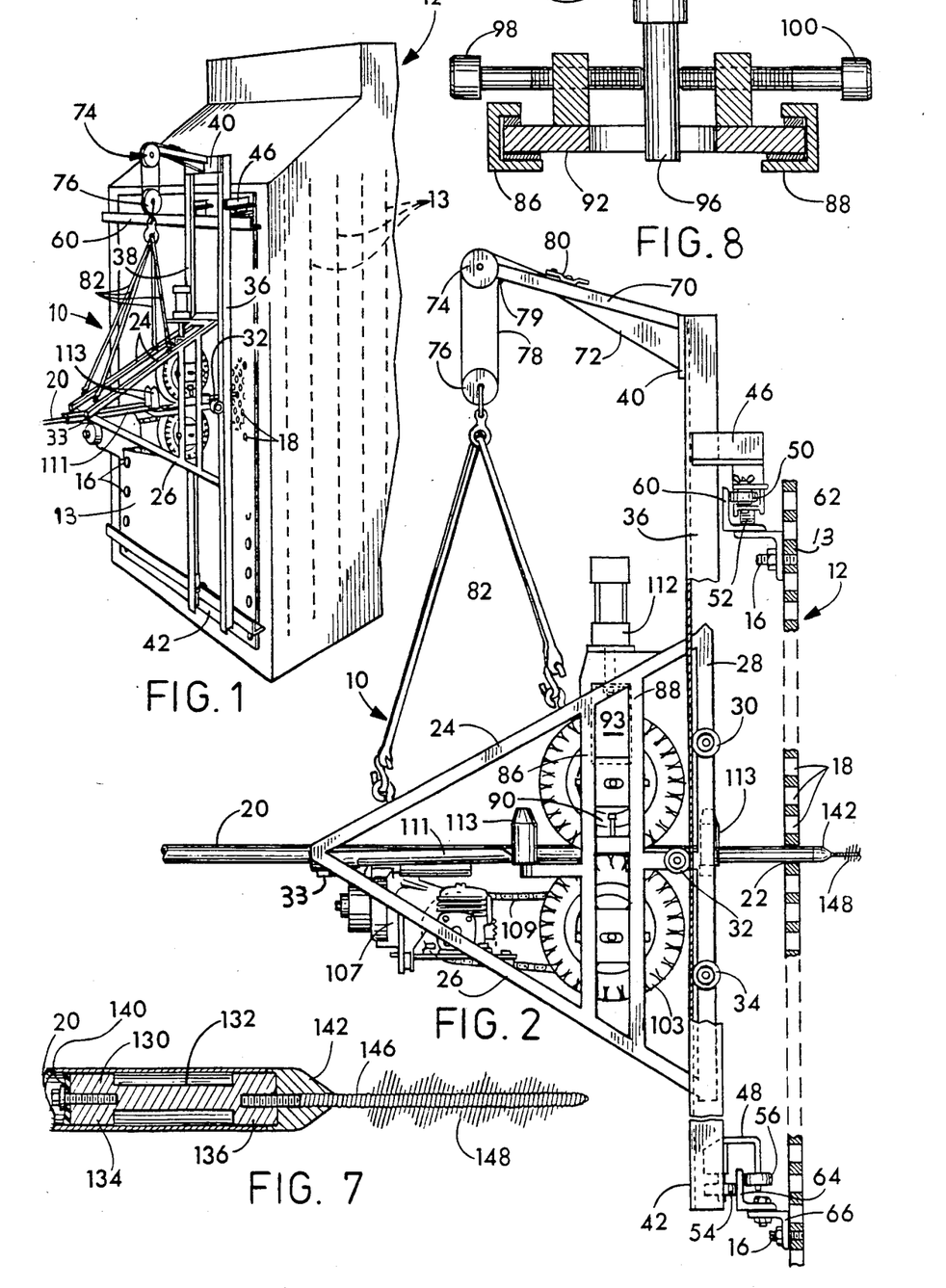
FIG. 1 is a perspective view of the invention being used to insert tubing into a steam condenser.
FIG. 2 is a side elevational view of the apparatus of FIG. 1 on a larger scale.
FIG. 7 is a longitudinal sectional view of the leading end of a tube as it is inserted and the hole clearing unit in accordance with the present invention.
FIG. 8 is a cross-section on line 8—8 of FIG. 4.
Figure 4:
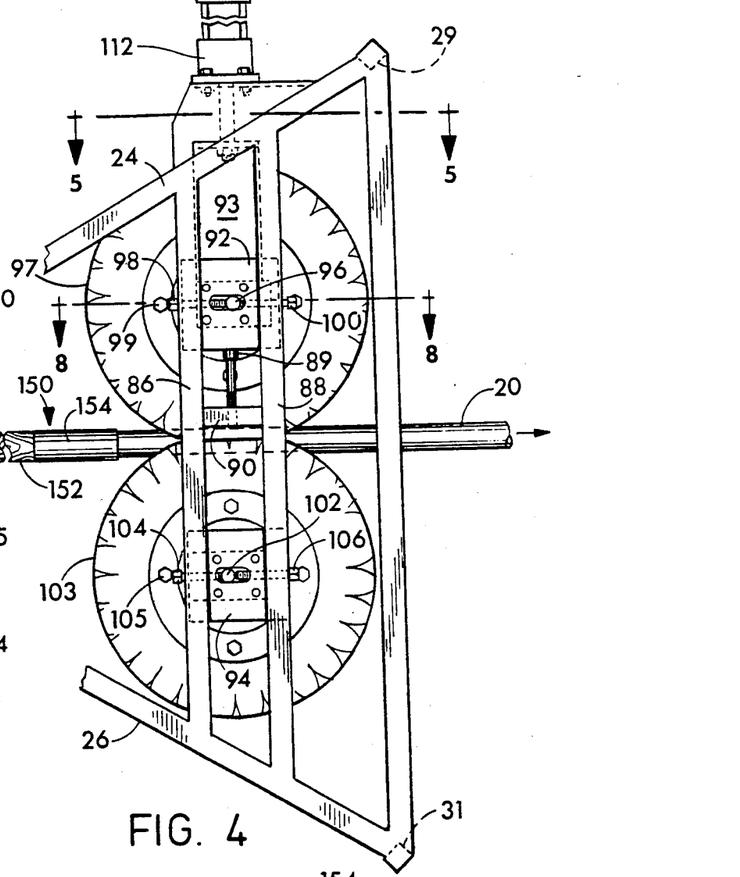
FIG. 4 is a partial side elevational view taken on line 4—4 of FIG. 3.

The apparatus 10 includes a supporting framework including upper and lower pairs of diagonal frame members 24 and 26 respectively, vertically disposed laterally spaced apart frame members 28 all connected to each other at their ends to form a generally triangular framework with horizontally disposed cross braces 29, 31 and 33 connected therebetween as shown in FIGS. 1 and 4. Mounted upon the framework are three pairs of vertically spaced apart support wheels 30, 32 and 34, only those on the right hand side of the apparatus being shown in FIG. 2, the other wheel of each pair being positioned in lateral alignment therewith. Each of wheels 30-34 is engaged upon one of two upright carriage members 36 and 38 rigidly connected together at their ends by cross braces 40 and 42 and supported during operation by means of brackets 46 and 48, the former having horizontal and vertical wheels 50 and 52 respectively engaging a horizontally disposed rail 60 that is connected to the heat exchanger at its ends by means of angle iron 62 and two or more of the fasteners 16. Similarly, the bottom of the carriage composed of the uprights 36, 38 is supported upon a bracket 48 which includes a pair of wheels 54 and 56 adapted to engage a rail 64 supported upon angle iron 66 which is, in turn, bolted to the heat exchanger 12 by means of fasteners 16. In this way, the carriage 36-42 will be able to move freely to the right or left across the face of the heat exchanger 12 during the insertion of successive tubes while the framework 24-33 is allowed to ride up and down by the engagement of wheels 30-34 with the uprights 36, 38. The framework 24-33 is supported upon the carriage by means of a boom 70 extending outwardly from the frame cross member 40 and being supported in part by means of a brace 72 rigidly secured thereto as by welding with a pulley 74 at its free end supporting a lower pulley 76 by the provision of a cable 78 secured at one end 79 to the free end of the boom and extending downwardly around pulley 76, upwardly over pulley 74 and attached to a plate 80 on the boom 70. Extending downwardly from the pulley 76 are suitable elastic supports such as rubber cords or springs, four cords 82 being shown in the example illustrated, with their lower ends connected to the frame members 24.

Figure 3:
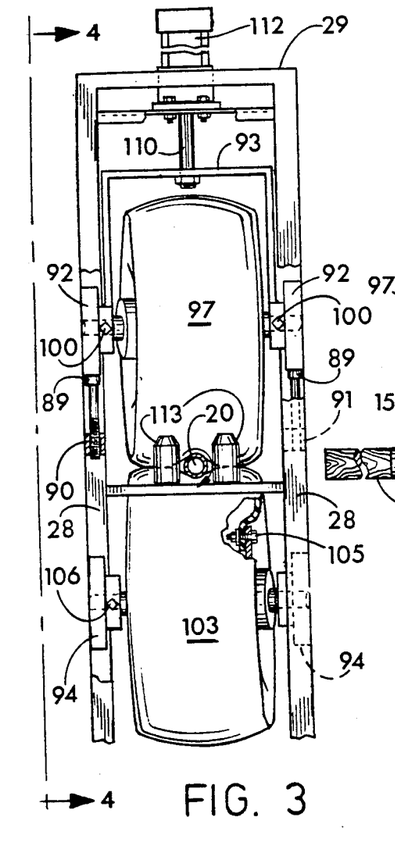
FIG. 3 is a partial right side elevational view of the apparatus of FIG. 2 on a larger scale.
Figure 5:
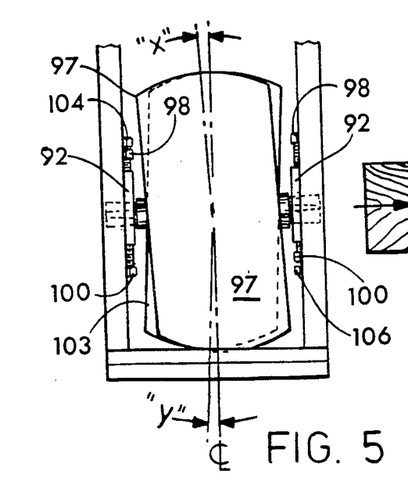
FIG. 5 is a partial horizontal sectional view taken on line 5—5 of FIG. 4.

The framework of the apparatus and related structure will now be described in more detail with particular reference to FIGS. 3 and 4. As seen in the figures, the framework includes two laterally spaced apart parallel vertically disposed pairs of frame members 86 and 88, only the pair closest to the observer being shown in FIG. 4. The frame members 86-88 are each U-shaped and suitably rigidly secured at their upper and lower ends to the frame members 24 and 26 and are provided with vertically spaced apart upper and lower pairs of bearing blocks 92 and 94 respectively. The lower blocks 94 are rigidly secured as by welding to the frame members 86 and 88, the upper pair of blocks are rigidly secured as by welding to the lower ends of a U-shaped support 93 that is itself supported at the lower end of a connecting rod 110 projecting downwardly from a positioning means such as a pneumatically operated positioning cylinder 112. Between the upper and lower pairs of bearing blocks are mounted upper and lower drive members such as wheels with rubber tires 97 and 103 which are supported upon axles 96 and 102 respectively. All four of the bearing blocks are provided with horizontally disposed axle slots which enable the axles 96 and 102 to be pitched or canted at an oblique angle with respect to the tube 20. The axles 96, 102 are positioned and held in place by means of front and rear set screws 98, 100 for wheel 97 and 104 and 106 for wheel 103. As can be clearly seen in FIG. 3, wheel 97 is canted to the right in the figure and wheel 103 is canted in the opposite direction to the left. Thus, when the wheels turn in given feed directions, the tubing 20 will spin or rotate in a clockwise direction as seen in FIG. 3 as it is simultaneously advanced, typically making one turn for each 30" of forward travel. Threaded vertically in cross brace members 90 which extend between the frame members 86 and 88 are provided stops which in this case comprise bolts having heads 89 which are engaged at times by the bearing blocks 92 limiting their downward motion. To make sure that the tires will not slip, they are preferably secured as by means of fasteners such as bolts 99 and 105 to their respective wheels. The lower wheel and tire assembly 103 is driven during operation by means of a suitable drive motor 107 connected through a chain and sprocket assembly 109 (FIG. 2) which is not shown in FIG. 3 so that associated parts may be clearly seen. The motor 107 thus drives the wheel and tire assembly 103 directly and the tire 103 in turn engages tube 20 through friction. The amount of air pressure used in the tires 97, 103 is selected and maintained along with the fluid pressure in cylinder 112 to provide the desired frictional engagement between the tires and the tube. If either the fluid pressure in the cylinder 112 or the pressure in the tires is increased, frictional engagement will be increased. The maximum downward movement of the upper tire 97 is limited by the stops 89. This serves to limit the amount of pressure that can be applied by the cylinder 112. As a result, during operation rotation of the upper and lower endless drive members 97 and 103 frictionally engage the tubing thereby advancing it while simultaneously spinning it on its own axis whereby the tube rotates as it advances through the heat exchanger thereby distributing stresses on the tubing and relieving the buildup of pressures thereby reducing damage to the tube and simultaneously assiting in clearing the tube openings in the tube plates or baffles. Under dynamic conditions of operation, the tube may, when it strikes an obstruction, stop advancing temporarily because of the obstruction and, while the tires 97 and 103 slip on the surface of the tube 20, the tube may continue to spin thereby clearing the obstruction from the opening in the baffle which then allows the tube to continue to move in a forward direction. In FIG. 5, it can be seen that the tire and wheel assemblies 97 and 103 are pitched in opposite directions X and Y respectively from the center line of the tubing and the thrust axis by an acute angle, typically about 6°. The tube is held between the wheels for manual loading by trough 110 connected to the framework above brace 33. If desired the tube 20 can also be guided as required by two cooperating pairs of vertically disposed laterally spaced apart guide rollers 113 mounted on the framework for rotation on vertical axes on opposite sides of the tube 20 as seen in FIGS. 1, 2 and 3.

As shown in FIG. 3, the tires 97, 103 engage each other on opposite sides of the tube 20 thereby imparting driving motion from tire 103 to tire 97. However, if desired, the tire 97 can, in the alternative, be mechanically driven or be unpowered. In one apparatus embodying the present invention, tire 97 was inflated to 5 psi and tire 103 to a pressure of 12 psi. About 80–90 psi is used in cylinder 112.

Refer now to FIGS. 1 and 7 which illustrate the debris clearing pilot 130 in accordance with the invention. As shown in FIG. 7, the pilot 130 comprises a cylinder slightly smaller in diameter than the tube 20 with a reduced center section 132 bounded at each end by head pieces 134, 136 adapted to slide easily into the end of the tube. Secured as by means of a bolt to the rear end of the pilot 130 is a rubber gasket 140 to hold the pilot in place and seal the end of the tube. A replaceable nose piece 142 with a pointed forward end is removably secured to the forward end of the pilot and can, if desired, be provided with a forwardly extending brush 146 including wire bristles 148 for clearing debris from the openings in the baffle plates 13 (FIG. 1). Following complete insertion of the tube 20, the pilot 130 is removed by blowing compressed air into the trailing end of the tube to force the pilot out of the tube.

Figure 6:
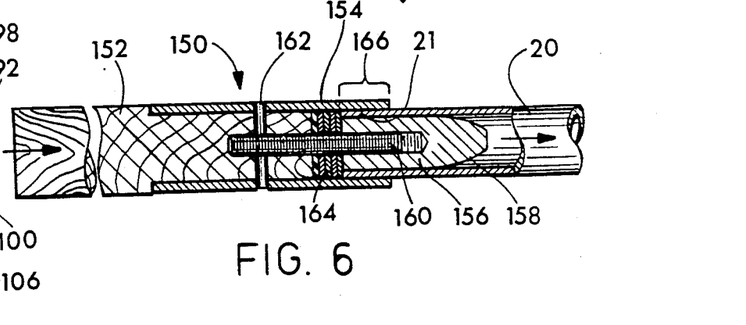
FIG. 6 is an enlarged longitudinal sectional view taken through the trailing end of the tube and the leading end of a stock setting means in accordance with the present invention.

To establish the extension or stock length of the projecting end of the tube, a stock setter 150 is provided. It is attached to the trailing end of the tube as shown in FIGS. 4 and 6. The stock setter 150 includes a rod such as a wooden rod 152 having a reduced forward end over which is mounted a tube 154 slightly larger in diameter than the tube 20. A nose piece 156 with a forward end tapered at 158 is secured to the rod 152 by means of a fastener, e.g., a threaded lug 160 which is itself secured to the stock setter 150 by pin 162 that also holds tube 154 in place on the end of the rod 152. Between the nose piece 156 and the adjacent end of the rod 152 are washers 164, one of which may be of rubber for cushioning purposes. The number of washers used controls the extension or stock length of the end of the tube projecting from the tube sheet. As shown in FIG. 6, the tube 20 extends into the stock setter by a distance 166 corresponding to the desired tube stock projection length.

The operation of the apparatus will now be described. The operator stands to one side of the apparatus and raises the upper tire 97 by operating the cylinder 112. He then sight aligns the drive wheels with the selected tube sheet hole. One tube is then picked up from its box, the tube cleaning pilot 130 is attached to its leading end, it is placed in the tube sheet hole and the tire 97 is lowered by applying air pressure to the cylinder 112. Since the framework 24–33 is suspended resiliently from the boom 70, it will automatically be lined up with the tube 20. The motor 107 is then started thereby spin driving the tube into the heat exchanger. As the tube advances, it may occasionally speed up or slow down and even stop depending upon the presence of obstructions most of which will be cleared by the continued rotation or spinning of the tube which can take place even if the forward motion ceases. When the end of the tube is reached, the stock setter 150 is manually applied to the trailing end of the tube allowing the tires to drive the tube to the predetermined end stock projection distance from the first tube sheet or baffle 13. The insertion time for a 46 foot tube was 15 seconds when the invention was used under normal field conditions.

A number of other advantages are obtained. The low pressure pneumatic tires provide a drive traction surface of from about one square inch to almost 15 square inches on the surface of the tube and, because the tires are close to the tube sheet, there is little likelihood of the tube collapsing from forward thrust. The framework and carriage are easily maneuvered and the small size of the apparatus allows multiple machines to be operated simultaneously on one tube sheet. Alternatively, the apparatus can be provided with multiple pairs of tires aligned side-by-side for inserting more than one tube at a time.

It can also be seen that the suspension provided by the elastic cords 82 and cable 78 shifts the weight of the apparatus from the delicate tube material and allows the machine to align itself with the tube sheet hole. Thus the carriage and framework 24–33 allows free movement both horizontally and vertically for centered alignment of the endless drive members.

The set screws can be adjusted to direct the force applied by the tires to angles of from 0°–15° so as to spin drive the tube forwardly into the heat exchanger minimizing the stresses throughout the tube while it flexes as it is withdrawn from the shipping box through the machine and into place. The spin drive of the tube assists in self-centering the tube pilot 130 and reduces friction and the insertion resistance in difficult areas as the pilot 130 cleans the holes before the tube enters.

Various adjustments can be provided. For example, lowering the compression wheels stop heads 89 causes the lower tire 103 and the compression tire 97 to engage more completely producing two-wheel drive. Lowering the stops also increases the maximum surface area on the tube circumference. Tire air pressure is adjusted to conditions of use and the machine is forgiving; if the tube cannot enter a hole for any reason, the tires will slip on the tube until stopped by the operator while the hole is checked for distortion or obstructions.

Many variations of the present invention will be apparent to those skilled in the art within the scope of the appended claims once the principles described above are understood.

What is claimed is:

1. A method of inserting a tube into a heat exchanger comprising:
   (1) engaging the tube with at least one endless drive member and supporting the tube on such drive member with no other tube supports between the drive member and the heat exchanger,
   (2) advancing and simultaneously rotating the tube on its own axis by rotating the drive member about an axis canted with respect to the tube axis whereby the tube tends to continuously rotate about its axis as it is moved into the heat exchanger to thereby distribute stresses on the tube as it is advanced and reduce the buildup of pressure therein thereby helping to prevent damage to the tube and assist in clearing the tube openings in the heat exchanger.

2. A method of inserting tubes into a heat exchanger comprising, frictionally engaging the tube with at least one air inflated endless drive member, selecting and maintaining the air pressure in said drive member for maintaining a predetermined amount of frictional force between the tube and the endless drive member to drive the tube and simultaneously continuously rotate the tube about the axis of the tube until an obstruction is encountered, and permitting the endless drive member to slip on the tube when resistance to movement of the tube exceeds the frictional drive provided by the endless drive member thereby reducing damage to the tube.

3. A method of inserting tubes into a heat exchanger comprising engaging the tube with drive means for advancing the tube into the heat exchanger, temporarily mounting a hole cleaner on a leading end of the tube and advancing the tube with the drive means while the hole cleaner is mounted on the leading end of the tube, and removing the hole cleaner from the leading end of the tube after the tube is thus inserted into the heat exchanger.

4. The method of claim 3 wherein the tube cleaner is slideably and hermetically sealed on the leading end of the tube, and fluid under pressure is forced into the tube to remove the hole cleaner following insertion of the tube.

5. A method of inserting tubes into a heat exchanger comprising engaging the tube with at least one power driven drive member for advancing the tube longitudinally into the heat exchanger, mounting a stock setter at the rear end of the tube, said stock setter including stop member projecting forwardly from the rear end of the tube a predetermined distance and allowing said stop member to strike a fixed object to establish the extension of the rear end of the tube from the heat exchanger.

6. A method of inserting tubes into a heat exchange device having a multiplicity of tube openings into which tubes are to be placed comprising, supporting the tube between at least a pair of cooperating and opposed air inflated drive elements engaging the tube on opposite sides thereof; controlling the frictional engagement between the tube and the drive elements by regulating air pressure therein, turning the drive elements to advance the tube in a given feed direction and simultaneously rotating the tube on its own axis to twist the tube into the heat exchanger so as to balance out the dynamic drag forces on the tube as the tube passes into the heat exchange device and thereby reduce bending or distortion of the tube.

7. A method of inserting tubes into a heat exchanger comprising introducing one end of said tube into an opening in the heat exchanger, engaging the tube with at least one drive member having a motor and which drive member has a resilient friction surface for forcing the tube axially into the opening, the resilient friction surface allowing slippage between the drive member and the tube, energizing the motor to drive the tube into the heat exchanger, and allowing the tube to slip relative to the drive member when forward motion of the tube is retarded to avoid damage to the tube while the motor continues to exert a driving force on the tube in a forward direction to facilitate the clearing of an obstruction in the heat exchanger.

8. An apparatus for inserting a tube into a heat exchanger comprising at least one drive means having a support surface positioned below and being engagable with a tube to be inserted for advancing such tube axially into the heat exchanger and through a plurality of baffles that exert a drag on such tube, and means operatively associated with the drive means for substantially continuously rotating such tube on its own axis as it is advanced successively through baffles in a heat exchanger to help equalize stresses within a tube being inserted into such heat exchanger and avoid damage to such tube.

9. The apparatus of claim 8 wherein said spinning means comprises means supporting the drive means at an oblique angle with respect to the longitudinal axis of the tube being inserted into such heat exchanger to direct a force against the tube at an angle no greater than 15° with respect to the longitudinal axis to thereby rotate the tube as it is advanced in a forward direction along its own axis.

10. The apparatus of claim 8 wherein at least two cooperating endless drive members are provided on opposite sides of the tube being inserted to define a pair of endless drive members with the tube passing therebetween and said drive members are canted in opposite directions whereby each produces a driving force on one side of the tube oriented at an acute angle and in opposite directions with respect to the longitudinal axis of the tube to thereby spin the tube as the tube advances.

11. The apparatus of claim 10 wherein the drive members are air inflated tires mounted upon wheels with at least one of the wheels being driven by a motor.

12. The apparatus of claim 11 wherein guide rollers are positioned on opposite sides of the center of the tube between the tires.

13. A tube insertion apparatus for inserting tubing into a heat exchanger comprising a supporting framework, a pair of opposed cooperating air inflated tires rotatable about central axes and adapted to receive the tube therebetween and to engage the tube on opposite sides thereof, a drive motor connected to at least one of the tires for imparting motion thereto, selectively operable adjustment means for canting the central axis of at least one air inflated tire at an oblique angle, other than perpendicular, with respect to the longitudinal axis of the tube, to thereby provide force tending to move such tube axially, and simultaneously and substantially continuously to tend to rotate the tube about its axis.

14. The apparatus of claim 13 wherein the tire pressure is predetermined to select and maintain frictional engagement between the tires and the tube whereby the tube is free to slip with respect to the tires upon striking an obstruction in the heat exchanger.

15. The apparatus of claim 13 wherein at least one of the tires is retractable from the other tire and positioning means is connected to the retractable tire to separate the tires from one another.

16. The apparatus of claim 15 wherein a stop means is provided for limiting the motion of one tire toward the other.

17. A tube inserting apparatus for a heat exchanger having an endless drive member frictionally engaging the tube to advance the tube into the heat exchanger through openings in support members for the tube, a motor connected to the drive means, and a removable pilot adapted to be temporarily installed in a leading end of the tube, said pilot having a tapered leading end, and a brush mounted at the leading end thereof and leading the pilot for removal of obstructions in the openings in the support members for the tube prior to insertion of the pilot into such opening.

18. The apparatus of claim 17 wherein the hermetic seal comprises a rubber gasket between the pilot and the inside surface of the tube, said gasket being connected to the pilot.

19. An apparatus for inserting tubes into a heat exchanger comprising a supporting framework, drive means operatively connected to the supporting framework for engaging the tube and for advancing the tube into the heat exchanger and a stock setter adapted to be attached to a rearward end of said tube, said stock setter including a stop means extending forwardly from the rear end of the tube by a predetermined distance and being adapted to engage a fixed object when the tube is inserted thereby allowing a predetermined amount of the tube to extend out from the end of the heat exchanger for flaring and/or sealing to the heat exchanger.

20. The apparatus of claim 19 wherein the stock setter comprises an elongated rod including a tubular member slideably engagable over a rear end of the tube, a nose piece inside the tubular section providing an annular space between itself and the tubular section for the rear end of the tube and a limiting member at the rear end of the nose piece to limit the distance that the tube extends into the stock setter to thereby establish the extension of the tube from the heat exchanger as the tube and then the rod are successively engaged by the drive means to force the tube into the heat exchanger.

21. An apparatus for inserting a tube into a heat exchanger through tube receiving openings in a support member in the heat exchanger comprising, means for engaging the tube to force the tube into an opening in the heat exchanger and a pilot removably mounted on a leading end of the tube and having a cleaning brush at its forward end of size to brush obstructions in the openings prior to the time the pilot and tube enter the openings.

22. An apparatus for inserting a tube into a heat exchanger comprising, means for engaging the tube and advancing the tube into an opening in the heat exchanger, a tail stock projection control member releasably mountable on a trailing end of the tube and including a rod section adapted to be engaged by the apparatus after most of the tube has been inserted into the heat exchanger, and a stop on the control member adapted to strike a fixed object to control the distance the tube extends from the heat exchanger, said stop comprising a tubular section on a forward end of the control member slideable over the tube and projecting toward the heat exchanger a predetermined selected distance to strike the heat exchanger as the tube is being inserted during operation and thereby determine the distance the tube projects therefrom.

23. An apparatus for inserting tubes into tube receiving heat exchanger openings comprising,
a carriage adapted to be mounted adjacent tube receiving openings of a heat exchanger,
a framework separate from the carriage, said framework supporting power driven endless drive means engagable with a tube to be inserted for contacting such tube and which drive means are operable for forcing the tube through the framework and into the heat exchanger,
yieldable support means connected between the carriage and the framework allowing the framework to move in response to forces from the tube with respect to the carriage without substantial restraint and thereby automatically line up with a tube inserted into a tube receiving opening when the drive means is subsequently engaged on such tube, and
said yieldable support means including means for adjustably mounting it on the carriage for alignment and thereafter yielding for supporting the weight of the framework and the drive means on the carriage and thereby permitting the drive means to apply substantially only axial and rotational forces on such tube.

24. The apparatus of claim 23 wherein the yieldable support has at least one elastic supporting member extending downwardly from a portion of the carriage and having a lower end connected to the framework to yieldably support the framework for movement relative to the carriage.

* * * * *

UNITED STATES PATENT AND TRADEMARK OFFICE
CERTIFICATE OF CORRECTION

PATENT NO. : 4,785,516

DATED : November 22, 1988

INVENTOR(S) : Richard G. Gilbertson

It is certified that error appears in the above-identified patent and that said Letters Patent is hereby corrected as shown below:

Column 7, line 47, after "including" insert --a--.

Column 8, line 24, delete "spinning" and insert --rotating--.

Signed and Sealed this

Thirteenth Day of June, 1989

Attest:

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,785,516

DATED : November 22, 1988

INVENTOR(S) : Richard G. Gilbertson

It is certified that error appears in the above-identified patent and that said Letters Patent is hereby corrected as shown below:

Column 9, delete lines 4-14 (Claim 17) and insert the following:
--17. A tube inserting apparatus for a heat exchanger having an endless drive member frictionally engaging the tube to advance a tube to be inserted into the heat exchanger through openings in support members for the tube, a motor connected to the drive means, and a removable pilot adapted to be temporarily installed in a leading end of the tube, said pilot having a tapered leading end, and a brush mounted at the leading end thereof and leading the pilot for removal of obstructions in the openings in the support members for the tube prior to insertion of the pilot into such opening, said pilot including a hermetic seal in the end of the tube whereby air introduced into the tube behind the pilot can force the pilot from the end of the tube following insertion of the tube.--

Column 9, delete lines 43-49.

Column 10, delete lines 1-2 (Claim 21) and insert the following:

UNITED STATES PATENT AND TRADEMARK OFFICE
CERTIFICATE OF CORRECTION

PATENT NO. : 4,785,516

DATED : November 22, 1988

INVENTOR(S) : Richard G. Gilbertson

It is certified that error appears in the above-identified patent and that said Letters Patent is hereby corrected as shown below:

--21. An apparatus for inserting a tube into a heat exchanger through tube receiving openings in a support member in the heat exchanger comprising, means for engaging the tube to force the tube into an opening in the heat exchanger and a pilot removably mounted on a leading end of the tube, a replaceable nose piece on the forward end of said pilot, a cleaning brush at the forward end of the replaceable nose piece of size to brush obstructions in the openings prior to the time the pilot and tube enter the openings, and sealing means between the tube and the pilot for enabling the pilot to be blown out of the end of the tube by introducing a compressed gas into the tube at a location behind the pilot.--

Signed and Sealed this

Eighteenth Day of June, 1991

*Attest:*

HARRY F. MANBECK, JR.

*Attesting Officer*      *Commissioner of Patents and Trademarks*